(12) United States Patent
Gou et al.

(10) Patent No.: US 9,535,747 B2
(45) Date of Patent: Jan. 3, 2017

(54) APPLICATION HEARTBEAT PERIOD ADJUSTING METHOD AND APPARATUS, AND TERMINAL

(71) Applicant: Huawei Device Co., Ltd., Shenzhen (CN)

(72) Inventors: Junwei Gou, Shanghai (CN); Wei Li, Wuhan (CN); Shizheng Yang, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 226 days.

(21) Appl. No.: 14/582,910

(22) Filed: Dec. 24, 2014

(65) Prior Publication Data

US 2015/0121383 A1 Apr. 30, 2015

Related U.S. Application Data

(63) Continuation of application No. PCT/CN2014/070396, filed on Jan. 9, 2014.

(30) Foreign Application Priority Data

Jan. 25, 2013 (CN) .......................... 2013 1 0028340

(51) Int. Cl.
 *G06F 9/48* (2006.01)
 *G06F 1/32* (2006.01)
 *G06F 9/46* (2006.01)
(52) U.S. Cl.
 CPC ............. *G06F 9/4893* (2013.01); *G06F 1/329* (2013.01); *Y02B 60/144* (2013.01)

(58) Field of Classification Search
None
See application file for complete search history.

(56) References Cited

U.S. PATENT DOCUMENTS

| 8,583,101 | B1 | 11/2013 | Xu et al. |
| 8,880,927 | B2 | 11/2014 | Zhao et al. |
| 2002/0184288 | A1 | 12/2002 | Vargas et al. |

(Continued)

FOREIGN PATENT DOCUMENTS

| CN | 101359238 A | 2/2009 |
| CN | 102117114 A | 7/2011 |

(Continued)

*Primary Examiner* — Eric C Wai
(74) *Attorney, Agent, or Firm* — Slater Matsil, LLP

(57) ABSTRACT

Embodiments of the present invention disclose an application heartbeat period adjusting method and apparatus, and a terminal, and in the embodiments, it is determined, according to an identifier of an application, that the application is in a heartbeat adjustment blacklist. A first heartbeat period of the application is adjusted to a second heartbeat period according to a preset trigger heartbeat period. The heartbeat adjustment blacklist includes an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

17 Claims, 2 Drawing Sheets

Determine, according to an identifier of an application, that the application is in a heartbeat adjusting blacklist, where the heartbeat adjusting blacklist includes an identifier of an application on which a heartbeat period adjustment needs to be performed — 101

Adjust a first heartbeat period of the application to a second heartbeat period according to a preset trigger heartbeat period — 102

(56) References Cited

U.S. PATENT DOCUMENTS

| | | | |
|---|---|---|---|
| 2003/0110416 A1* | 6/2003 | Morrison | G06F 9/54 |
| | | | 714/39 |
| 2010/0169681 A1 | 7/2010 | Wong et al. | |
| 2011/0185216 A1 | 7/2011 | Zhao et al. | |
| 2012/0170496 A1* | 7/2012 | Yang | H04W 52/0225 |
| | | | 370/311 |
| 2013/0194993 A1* | 8/2013 | Choi | H04L 67/14 |
| | | | 370/311 |

FOREIGN PATENT DOCUMENTS

| | | |
|---|---|---|
| CN | 102843250 A | 12/2012 |
| CN | 103118188 A | 5/2013 |
| EP | 2725740 A1 | 4/2014 |
| GB | 2439104 A | 12/2007 |
| GB | 2476354 A | 6/2011 |
| KR | 20090018256 A | 2/2009 |
| WO | 2012136161 A2 | 10/2012 |

\* cited by examiner

APPLICATION HEARTBEAT PERIOD ADJUSTING METHOD AND APPARATUS, AND TERMINAL

This application is a continuation of International Application No. PCT/CN2014/070396, filed on Jan. 9, 2014, which claims priority to Chinese Patent Application No. 201310028340.0, filed on Jan. 25, 2013, both of which are hereby incorporated by reference in their entireties.

TECHNICAL FIELD

Embodiments of the present invention relate to the field of computer, and in particular, to an application heartbeat period adjusting method and apparatus, and a terminal.

BACKGROUND

Currently, an increasing number of applications are installed in a terminal. Using three applications, namely, the Huawei Cloud, the Mobile QQ, and the WeChat, as examples, because each application has a different heartbeat period, each application periodically wakes up the terminal according to its own heartbeat period, so as to ensure a connection between the application and a server end or that some statuses in the application are refreshed. Generally, power of these applications is about 50 mAh per hour, and for a 1820 mAh battery level of Honor smartphone, power consumed by opening a screen, dialing and answering phone calls, the Huawei Cloud, the Mobile QQ, and the WeChat accounts for 65.9% of the battery level of the terminal.

Because each application of the foregoing terminal has a different heartbeat period, the terminal in a standby state is often woken up by clocks of these applications, and cannot enter deep sleep, leading to a problem that standby power consumption of the terminal is large.

SUMMARY

The present invention provides an application heartbeat period adjusting method and apparatus, and a terminal, so as to solve a problem that standby power consumption of a terminal is large.

According to a first aspect, the present invention provides an application heartbeat period adjusting method. The method includes determining, according to an identifier of an application, that the application is in a heartbeat adjustment blacklist. The method further includes adjusting a first heartbeat period of the application to a second heartbeat period according to a preset trigger heartbeat period, where the heartbeat adjustment blacklist includes an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

Based on the first aspect, in a first possible implementation manner, before the determining, according to an identifier of an application, that the application is in a heartbeat adjustment blacklist, the method includes, if it is determined that the application is not in an application whitelist, acquiring a heartbeat type and the first heartbeat period of the application. The method further includes, if the heartbeat type of the application is a heartbeat type that needs an adjustment, and it is determined, according to the first heartbeat period of the application, that the number of times the application wakes up a system within a preset period of time is greater than a preset times threshold, determining that the first heartbeat period of the application needs to be adjusted. The method further includes adding the identifier of the application to the heartbeat adjustment blacklist.

Based on the first possible implementation manner of the first aspect, in a second possible implementation manner, the acquiring a heartbeat type and the first heartbeat period of the application includes acquiring the heartbeat type and the first heartbeat period of the application according to an alarm configuration file of the application.

Based on the first aspect, the first and second possible implementation manners of the first aspect, in a third possible implementation manner, the adjusting a first heartbeat period of the application to a second heartbeat period according to a preset trigger heartbeat period includes adjusting the first heartbeat period of the application to the second heartbeat period according to the preset trigger heartbeat period by using an alarm adjustment algorithm. The alarm adjustment algorithm includes the following formula:

the second heartbeat period of the application=((the first heartbeat period of the application+the preset trigger heartbeat period−1)/the preset trigger heartbeat period)*the preset trigger heartbeat period.

Based on the first possible implementation manner of the first aspect, in a fourth possible implementation manner, before the it is determined that the application is not in an application whitelist, the method includes presetting the application whitelist, where the application whitelist includes an identifier of an application on which it is determined, according to an application attribute, that the heartbeat period adjustment does not need to be performed.

According to a second aspect, the present invention provides an application heartbeat period adjusting apparatus. The apparatus includes a first determining module, configured to determine, according to an identifier of an application, that the application is in a heartbeat adjustment blacklist. The apparatus further includes an adjusting module, configured to adjust a first heartbeat period of the application to a second heartbeat period according to a preset trigger heartbeat period on a basis that the first determining module determines that the application is in the heartbeat adjusting blacklist, where the heartbeat adjustment blacklist includes an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

Based on the second aspect, in a first possible implementation manner, the apparatus further includes an acquiring module, configured to acquire a heartbeat type and the first heartbeat period of the application on a basis that the first determining module determines that the application is not in an application whitelist. The apparatus further includes a second determining module, configured to, if the heartbeat type of the application is a heartbeat type that needs an adjustment, and it is determined, according to the first heartbeat period of the application, that the number of times the application wakes up a system within a preset period of time is greater than a preset times threshold, determine that the first heartbeat period of the application needs to be adjusted, and a setting module, configured to add the identifier of the application to the heartbeat adjustment blacklist.

Based on the first possible implementation manner of the second aspect, in a second possible implementation manner, the acquiring module is specifically configured to acquire the heartbeat type and the first heartbeat period of the application according to an alarm configuration file of the application.

Based on the second aspect, the first and second possible implementation manners of the second aspect, in a third possible implementation manner, the adjusting module is specifically configured to adjust the first heartbeat period of the application to the second heartbeat period according to the preset trigger heartbeat period by using an alarm adjustment algorithm. The alarm adjustment algorithm includes the following formula:

the second heartbeat period of the application=((the first heartbeat period of the application+the preset trigger heartbeat period−1)/the preset trigger heartbeat period)*the preset trigger heartbeat period.

Based on the first possible implementation manner of the second aspect, in a fourth possible implementation manner, the setting module is further configured to preset the application whitelist, where the application whitelist includes an identifier of an application on which it is determined, according to an application attribute, that the heartbeat period adjustment does not need to be performed.

According to a third aspect, the present invention provides a terminal, which includes the foregoing application heartbeat period adjusting apparatus.

In the embodiments of the present invention, whether an application is in a heartbeat adjustment blacklist is determined, and if yes, a first heartbeat period of the application is adjusted to a second heartbeat period according to a preset trigger heartbeat period, so that the second heartbeat period of the application coincides with the trigger heartbeat period, so as to adjust heartbeat period timing, which previously is disordered because of different first heartbeat periods of multiple applications, in a terminal to regular trigger heartbeat period timing, and therefore, the number of times the terminal is woken up can be reduced, and standby power consumption of the terminal can be reduced.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
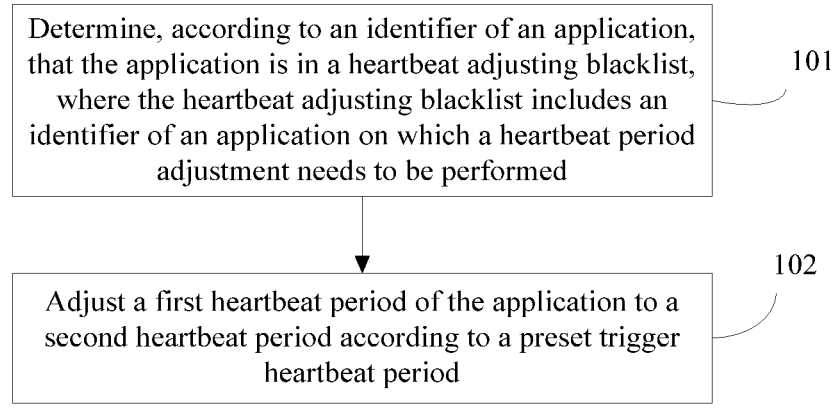
FIG. 1 is a schematic flowchart of an application heartbeat period adjusting method according to an embodiment of the present invention.

FIG. 1 is a schematic flowchart of an application heartbeat period adjusting method according to an embodiment of the present invention, and as shown in FIG. 1, the application heartbeat period adjusting method in the embodiment may include the following steps.

101: Determine, according to an identifier of an application, that the application is in a heartbeat adjustment blacklist, where the heartbeat adjustment blacklist includes an identifier of an application on which a heartbeat period adjustment needs to be performed.

In an embodiment of the present invention, before step 101, the method includes, if it is determined that the application is not in an application whitelist, a heartbeat type and the first heartbeat period of the application are acquired. The method further includes, if the heartbeat type of the application is a heartbeat type that needs an adjustment, and it is determined, according to the first heartbeat period of the application, that the number of times the application wakes up a system within a preset period of time is greater than a preset times threshold, it is determined that the first heartbeat period of the application needs to be adjusted, and the identifier of the application is added to the heartbeat adjustment blacklist.

In a specific implementation, for example, there may be alarms of some special applications, such as an alarm of a clock application, an alarm of a general packet radio service (General Packet Radio Service, GPRS for short), or an alarm of the Google (Google), in a terminal, and because of specificity of these applications, to avoid impact of a trigger heartbeat period on application services of some special applications, heartbeat periods set for the alarms of these applications do not need to be adjusted. In the embodiment, the application whitelist may be set, where the application whitelist includes an identifier of an application on which it is determined, according to an application attribute, that the heartbeat period adjustment does not need to be performed.

For another example, after it is determined that the application is not in the application whitelist, the heartbeat type and the first heartbeat period of the application need to be acquired, and generally, the heartbeat type and the first heartbeat period of the application may be acquired according to an alarm configuration file of the application.

It should be noted that, in an actual application, multiple applications are installed in the terminal, and each application may set a heartbeat type and a heartbeat period of the application by using an alarm (Alarm), so that each application periodically wakes up the system according to its own heartbeat period, thereby ensuring a connection between the application and a server or that some statuses in the application are refreshed. A heartbeat period is a timeout period preset by the alarm, and when an elapsed time reaches a timeout period preset by the alarm, an application service may be triggered by waking up the system. For ease of description, in the embodiment, an original heartbeat period that is set by an application by using the alarm is referred to as a first heartbeat period.

Heartbeat types of the embodiment include: RTC_WAKEUP, RTC, ELAPSE_WAKEUP, and ELAPSE, where the RTC_WAKEUP indicates triggering the application service by waking up a terminal at a specified time. The RTC indicates triggering the application service at an explicit time but not waking up the terminal. The ELAPSE_WAKEUP indicates, if the elapsed time reaches the timeout period after the terminal is enabled, triggering the application service but not waking up the terminal, the elapsed time includes any time when the terminal sleeps, and it should be noted that, a calculating point of the elapsed time is from a last time of enabling the terminal. The ELAPSE_REALTIME_WAKEUP indicates, if the elapsed time reaches the timeout period after the terminal is enabled, waking up the terminal and triggering the application service if it is required.

For another example, whether the first heartbeat period of the application needs to be adjusted is determined according to the acquired heartbeat type and the acquired first heartbeat period of the application. In the embodiment, the heartbeat types RTC_WAKEUP and ELAPSE_WAKEUP are set as heartbeat types that need to be adjusted. When the acquired heartbeat type of the application is the foregoing RTC_WAKEUP or ELAPSE_WAKEUP, it needs to further determine, according to the first heartbeat period of the application, whether the number of times the application wakes up the system within a preset period of time is greater than the preset times threshold. Assuming that waking up the system 4 times per hour is used as the preset times threshold, when the first heartbeat period of the application is 6 minutes, the application needs to wake up the system 10 times (greater than the preset times threshold 4 times) per hour, and the first heartbeat period of the application needs to be adjusted.

102: Adjust a first heartbeat period of the application to a second heartbeat period according to a preset trigger heartbeat period.

To achieve unified management of heartbeats of multiple applications in the terminal, the terminal is woken up in a unified manner according to a certain time pattern, and the terminal is enabled to stay long in a standby state, in the embodiment a trigger heartbeat period and an alarm adjustment algorithm are preset.

The trigger heartbeat period is an adjustment period according to which the first heartbeat period is adjusted. In an actual application, multiple applications are installed in a terminal, each application has a corresponding first heartbeat period, and the trigger heartbeat period in the embodiment may be specifically set according to first heartbeat periods of the multiple applications in the terminal, for example, assuming that the terminal has five applications, first heartbeat periods corresponding to each application are respectively 3 minutes (min), 4 min, 5 min, 7 min, and 8 min, to achieve unified management of heartbeats of the multiple applications in the terminal and wake up the terminal in a unified manner according to a time pattern, the trigger heartbeat period of the terminal may be set to 5 min. For another example, assuming that the first heartbeat periods corresponding to the five applications respectively are 6 min, 7 min, 8 min, 11 min, and 12 min, the trigger heartbeat period of the terminal may be set to 10 min.

The alarm adjustment algorithm includes the following formula:

$$When=((origwhen+sAlignmentPerid-1)/sAlignmentPerid)*sAlignmentPerid;$$

When is the second heartbeat period of the application, Origwhen is the first heartbeat period, and sAlignmentPerid is the preset trigger heartbeat period.

The foregoing alarm adjustment algorithm may be described as follows.

$$The\ second\ heartbeat\ period\ of\ the\ application = ((the\ first\ heartbeat\ period\ of\ the\ application + the\ preset\ trigger\ heartbeat\ period - 1)/the\ preset\ trigger\ heartbeat\ period)*the\ preset\ trigger\ heartbeat\ period.$$

For example, assuming that the first heartbeat period of the application is less than the trigger heartbeat period, for example, if the first heartbeat period is 3 seconds, and the preset trigger heartbeat period is 5 seconds, according to the foregoing alarm adjustment algorithm, (the first heartbeat period of the application+the preset trigger heartbeat period−1)/the preset trigger heartbeat period) equals 7/5, which is 1 after being rounded down. The second heart period of the application, obtained after 1 is multiplied by the preset trigger heartbeat period, equals 5 seconds.

For example, assuming that the first heartbeat period of the application is greater than the trigger heartbeat period, for example, if the first heartbeat period is 7 seconds, and the preset trigger heartbeat period is 5 seconds, according to the foregoing alarm adjustment algorithm, (the first heartbeat period of the application+the preset trigger heartbeat period−1)/the preset trigger heartbeat period) equals 11/5, which is 2 after being rounded down. The second heart period of the application, obtained after 2 is multiplied by the preset trigger heartbeat period, equals 10 seconds.

The following describes the embodiment of the present invention from a dimension of a timeline of an alarm.

Figure 2:
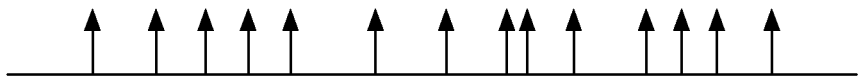
FIG. 2 is a timing diagram of first heartbeat periods, of multiple applications in a terminal, on a timeline of an alarm.

Assuming that there are multiple applications in a terminal, each application having a different first heartbeat period, FIG. 2 is a timing diagram of first heartbeat periods, of the multiple applications in the terminal, on the timeline of the alarm. As shown in FIG. 2, because each application has a different first heartbeat period, timing on the timeline of the alarm is disordered, the terminal in a standby state is often woken up by clocks of these applications, and cannot enter deep sleep, thereby wasting standby power consumption of the terminal.

Figure 3:
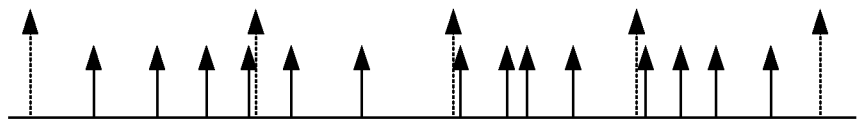
FIG. 3 is a timing diagram of a trigger heartbeat period, which is set on a terminal, on a timeline of an alarm according to an embodiment of the present invention.

To achieve unified management of heartbeats of the multiple applications in the terminal, the terminal is woken up in a unified manner according to a time pattern, and the terminal is enabled to stay long in a standby state, in the embodiment, the trigger heartbeat period is set on the disordered timeline of the alarm. FIG. 3 is a timing diagram of the trigger heartbeat period, which is set on the terminal, on the timeline of the alarm according to the embodiment, and as shown in FIG. 3, a dotted arrow indicates the set trigger heartbeat period.

Figure 4:
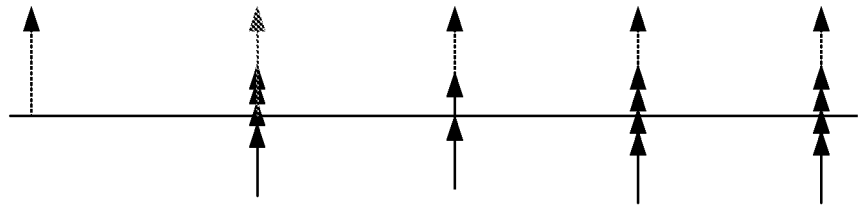
FIG. 4 is a timing diagram of second heartbeat periods, of multiple applications in a terminal, on a timeline of an alarm.

Then, delay processing is performed on a first heartbeat period that falls between trigger heartbeat periods, so that a second heartbeat period is obtained and the second heartbeat period coincides with the trigger heartbeat period. FIG. 4 is a timing diagram of second heartbeat periods, of the multiple applications in the terminal, on the timeline of the alarm, and as shown in FIG. 4, the terminal may originally be woken up 14 times, but after the first heartbeat periods of the multiple applications are adjusted to the second heartbeat periods according to the trigger heartbeat period provided in the embodiment, the terminal is woken up 5 times, and therefore, power consumption of the terminal can be reduced.

In the embodiments of the present invention, whether an application is in a heartbeat adjustment blacklist is determined, and if yes, a first heartbeat period of the application is adjusted to a second heartbeat period according to a preset trigger heartbeat period, so that the second heartbeat period of the application coincides with the trigger heartbeat period, so as to adjust heartbeat period timing, which previously is disordered because of different first heartbeat periods of multiple applications, in a terminal to regular trigger heartbeat period timing, and therefore, the number of times the terminal is woken up can be reduced, and standby power consumption of the terminal can be reduced.

Figure 5:
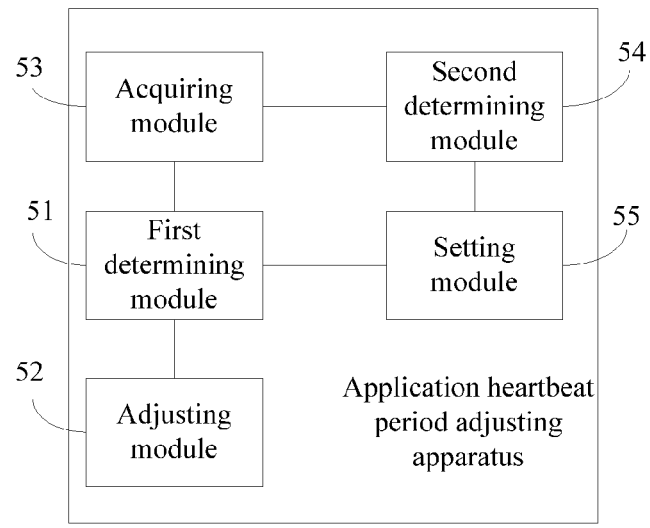
FIG. 5 is a schematic structural diagram of an application heartbeat period adjusting apparatus according to another embodiment of the present invention.

FIG. 5 is a schematic diagram of an application heartbeat period adjusting apparatus according to another embodiment of the present invention. As shown in FIG. 5, the apparatus includes a first determining module 51, configured to determine, according to an identifier of an application, that the application is in a heartbeat adjustment blacklist. The apparatus further includes an adjusting module 52, configured to adjust a first heartbeat period of the application to a second heartbeat period according to a preset trigger heartbeat period on a basis that the first determining module determines that the application is in the heartbeat adjusting blacklist, where the heartbeat adjustment blacklist includes an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

For example, the apparatus further includes an acquiring module 53, configured to acquire a heartbeat type and the first heartbeat period of the application on a basis that the first determining module 51 determines that the application is not in an application whitelist. The apparatus further includes a second determining module 54, configured to, if the heartbeat type of the application is a heartbeat type that needs an adjustment, and it is determined, according to the first heartbeat period of the application, that the number of times the application wakes up a system within a preset period of time is greater than a preset times threshold, determine that the first heartbeat period of the application needs to be adjusted, and a setting module 55, configured to add the identifier of the application to the heartbeat adjustment blacklist.

For example, the acquiring module 53 is specifically configured to acquire the heartbeat type and the first heartbeat period of the application according to an alarm configuration file of the application.

For example, the adjusting module 52 is specifically configured to adjust the first heartbeat period of the application to the second heartbeat period according to the preset trigger heartbeat period by using an alarm adjustment algorithm.

The alarm adjustment algorithm includes the following formula:

The second heartbeat period of the application=((the first heartbeat period of the application+the preset trigger heartbeat period−1)/the preset trigger heartbeat period)*the preset trigger heartbeat period.

For example, the setting module 55 is further configured to presetting the application whitelist, where the application whitelist includes an identifier of an application on which it is determined, according to an application attribute, that the heartbeat period adjustment does not need to be performed.

In the embodiment of the present invention, whether an application is in a heartbeat adjustment blacklist is determined, and if yes, a first heartbeat period of the application is adjusted to a second heartbeat period according to a preset trigger heartbeat period, so that the second heartbeat period of the application coincides with the trigger heartbeat period, so as to adjust heartbeat period timing, which previously is disordered because of different first heartbeat periods of multiple applications, in a terminal to regular trigger heartbeat period timing, and therefore, the number of times the terminal is woken up can be reduced, and standby power consumption of the terminal can be reduced.

Another embodiment of the present invention further provides a terminal, which includes the application heartbeat period adjusting apparatus described in the embodiment shown in FIG. 5, for specific content about the application heartbeat period adjusting apparatus, refer to related description of the embodiment shown in FIG. 5, which is not repeatedly described.

Figure 6:
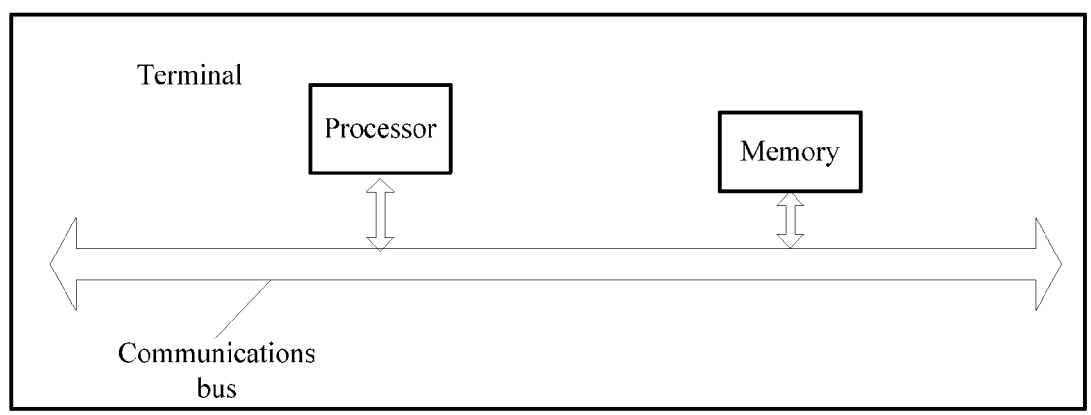
FIG. 6 is a schematic structural diagram of a terminal according to another embodiment of the present invention.

FIG. 6 is a schematic structural diagram of a terminal according to another embodiment of the present invention. As shown in FIG. 6, the terminal includes a processor, a memory, and a communications bus, where the processor is connected to the memory by using the communications bus, the memory stores an instruction of implementing an application heartbeat period adjusting method. When the processor invokes the instruction stored in the memory, the processor may execute the following steps. Determine, according to an identifier of an application, that the application is in a heartbeat adjustment blacklist. Adjust a first heartbeat period of the application to a second heartbeat period according to a preset trigger heartbeat period. The heartbeat adjustment blacklist includes an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

In a first possible implementation manner, before the determining, according to an identifier of an application, that the application is in a heartbeat adjustment blacklist, the following is included. If it is determined that the application is not in an application whitelist, acquiring a heartbeat type and the first heartbeat period of the application. If the heartbeat type of the application is a heartbeat type that needs an adjustment, and it is determined, according to the first heartbeat period of the application, that the number of times the application wakes up a system within a preset period of time is greater than a preset times threshold, determining that the first heartbeat period of the application needs to be adjusted. Adding the identifier of the application to the heartbeat adjustment blacklist.

Based on the first possible implementation manner, in a second possible implementation manner, the acquiring a heartbeat type and the first heartbeat period of the application includes acquiring the heartbeat type and the first heartbeat period of the application according to an alarm configuration file of the application.

Based on the first and second possible implementation manner, in a third possible implementation manner, the adjusting a first heartbeat period of the application to a second heartbeat period according to a preset trigger heartbeat period includes adjusting the first heartbeat period of the application to the second heartbeat period according to the preset trigger heartbeat period by using an alarm adjustment algorithm.

The alarm adjustment algorithm includes the following formula:

the second heartbeat period of the application=((the first heartbeat period of the application+the preset trigger heartbeat period−1)/the preset trigger heartbeat period)*the preset trigger heartbeat period.

Based on the first possible implementation manner, in a fourth possible implementation manner, before that it is determined that the application is not in an application whitelist, the following is included. Presetting the application whitelist, where the application whitelist includes an identifier of an application on which it is determined, according to an application attribute, that the heartbeat period adjustment does not need to be performed.

In the embodiment of the present invention, whether an application is in a heartbeat adjustment blacklist is determined, and if yes, a first heartbeat period of the application is adjusted to a second heartbeat period according to a preset trigger heartbeat period, so that the second heartbeat period of the application coincides with the trigger heartbeat period, so as to adjust heartbeat period timing, which previously is disordered because of different first heartbeat periods of multiple applications, in a terminal to regular trigger heartbeat period timing, and therefore, the number of times of the terminal is woken up can be reduced, and standby power consumption of the terminal can be reduced.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

The foregoing integrated unit, which is implemented in a form of a software functional unit, may be stored in a form of code in a computer-readable storage medium. The codes are stored in a computer readable storage medium, and include a number of instructions that enable a processor or a hardware circuit to execute all or a part of steps of the methods provided in the embodiments of the present invention. The storage medium may be any medium capable of storing program codes, such as a high-capacity miniature removable storage disk having a universal serial bus interface without a physical drive, a removable hard disk, a read only memory (Read-Only Memory, ROM), a random access memory (Random Access Memory, RAM), a magnetic disk, or a CD-ROM.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. An application heartbeat period adjusting method, comprising:
    determining, according to an identifier of an application, that the application is in a heartbeat adjustment blacklist; and
    adjusting a first heartbeat period of the application to a second heartbeat period according to a preset trigger heartbeat period, wherein
    the heartbeat adjustment blacklist comprises an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

2. The method according to claim 1, wherein adjusting the first heartbeat period of the application to the second heartbeat period comprises:
    adjusting the first heartbeat period of the application to the second heartbeat period according to the preset trigger heartbeat period by using an alarm adjustment algorithm, wherein
    the alarm adjustment algorithm includes:

the second heartbeat period of the application=((the first heartbeat period of the application+the preset trigger heartbeat period−1)/the preset trigger heartbeat period)*the preset trigger heartbeat period.

3. The method according to claim 1, wherein before determining that the application is in the heartbeat adjustment blacklist, the method comprises:

if it is determined that the application is not in an application whitelist, acquiring a heartbeat type and the first heartbeat period of the application;

if the heartbeat type of the application is a heartbeat type that needs an adjustment, and it is determined, according to the first heartbeat period of the application, that a number of times the application wakes up a system within a preset period of time is greater than a preset times threshold, determining that the first heartbeat period of the application needs to be adjusted; and adding the identifier of the application to the heartbeat adjustment blacklist.

4. The method according to claim 3, wherein adjusting the first heartbeat period of the application to the second heartbeat period comprises:

adjusting the first heartbeat period of the application to the second heartbeat period according to the preset trigger heartbeat period by using an alarm adjustment algorithm, wherein the alarm adjustment algorithm includes:

the second heartbeat period of the application=((the first heartbeat period of the application+the preset trigger heartbeat period−1)/the preset trigger heartbeat period)*the preset trigger heartbeat period.

5. The method according to claim 3, wherein before it is determined that the application is not in the application whitelist, the method comprises presetting the application whitelist, wherein the application whitelist comprises an identifier of an application on which it is determined, according to an application attribute, that the heartbeat period adjustment does not need to be performed.

6. The method according to claim 3, wherein acquiring the heartbeat type and the first heartbeat period of the application comprises acquiring the heartbeat type and the first heartbeat period of the application according to an alarm configuration file of the application.

7. The method according to claim 6, wherein adjusting the first heartbeat period of the application to the second heartbeat period comprises:

adjusting the first heartbeat period of the application to the second heartbeat period according to the preset trigger heartbeat period by using an alarm adjustment algorithm, wherein the alarm adjustment algorithm includes:

the second heartbeat period of the application=((the first heartbeat period of the application+the preset trigger heartbeat period−1)/the preset trigger heartbeat period)*the preset trigger heartbeat period.

8. An application heartbeat period adjusting apparatus, comprising:

a first determining module, configured to determine, according to an identifier of an application, that the application is in a heartbeat adjustment blacklist; and an adjusting module, configured to adjust a first heartbeat period of the application to a second heartbeat period according to a preset trigger heartbeat period, if the first determining module determines that the application is in the heartbeat adjusting blacklist, wherein the heartbeat adjustment blacklist comprises an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

9. The apparatus according to claim 8, wherein the adjusting module is specifically configured to adjust the first heartbeat period of the application to the second heartbeat period according to the preset trigger heartbeat period by using an alarm adjustment algorithm, wherein the alarm adjustment algorithm includes:

the second heartbeat period of the application=((the first heartbeat period of the application+the preset trigger heartbeat period−1)/the preset trigger heartbeat period)*the preset trigger heartbeat period.

10. The apparatus according to claim 8, further comprising:

an acquiring module, configured to acquire a heartbeat type and the first heartbeat period of the application, if the first determining module determines that the application is not in an application whitelist;

a second determining module, configured to, if the heartbeat type of the application is a heartbeat type that needs an adjustment, and it is determined, according to the first heartbeat period of the application, that a number of times the application wakes up a system within a preset period of time is greater than a preset times threshold, determine that the first heartbeat period of the application needs to be adjusted; and a setting module, configured to add the identifier of the application to the heartbeat adjustment blacklist.

11. The apparatus according to claim 10, wherein the adjusting module is specifically configured to adjust the first heartbeat period of the application to the second heartbeat period according to the preset trigger heartbeat period by using an alarm adjustment algorithm, wherein the alarm adjustment algorithm includes:

the second heartbeat period of the application=((the first heartbeat period of the application+the preset trigger heartbeat period−1)/the preset trigger heartbeat period)*the preset trigger heartbeat period.

12. The apparatus according to claim 10, wherein the setting module is further configured to preset the application whitelist, wherein the application whitelist comprises an identifier of an application on which it is determined, according to an application attribute, that the heartbeat period adjustment does not need to be performed.

13. The apparatus according to claim 10, wherein the acquiring module is specifically configured to acquire the heartbeat type and the first heartbeat period of the application according to an alarm configuration file of the application.

14. The apparatus according to claim 13, wherein the adjusting module is specifically configured to adjust the first heartbeat period of the application to the second heartbeat period according to the preset trigger heartbeat period by using an alarm adjustment algorithm, wherein the alarm adjustment algorithm includes:

the second heartbeat period of the application=((the first heartbeat period of the application+the preset trigger heartbeat period−1)/the preset trigger heartbeat period)*the preset trigger heartbeat period.

15. A terminal, comprising:
a processor; and
a computer-readable storage medium storing a program to be executed by the processor, the program including instructions for:

determining, according to an identifier of an application, that the application is in a heartbeat adjustment blacklist; and adjusting a first heartbeat period of the application to a second heartbeat period according to a preset trigger heartbeat period, wherein the heartbeat adjustment blacklist comprises an identifier of an application on which a heartbeat period adjustment needs to be performed, the first heartbeat period of the application is an original heartbeat period of the application, the second heartbeat period is a heartbeat period, which is adjusted according to the preset trigger heartbeat period, of the application, and the preset trigger heartbeat period is an adjustment period according to which the first heartbeat period is adjusted.

16. The terminal according to claim 15, wherein before determining that the application is in the heartbeat adjustment blacklist, the program includes instructions for:

acquiring a heartbeat type and the first heartbeat period of the application if it is determined that the application is not in an application whitelist;

determining that the first heartbeat period of the application needs to be adjusted if the heartbeat type of the application is a heartbeat type that needs an adjustment, and it is determined, according to the first heartbeat period of the application, that a number of times the application wakes up a system within a preset period of time is greater than a preset times threshold; and adding the identifier of the application to the heartbeat adjustment blacklist.

17. The terminal according to claim 15, wherein the program further includes instructions for:

adjusting the first heartbeat period of the application to the second heartbeat period according to the preset trigger heartbeat period by using an alarm adjustment algorithm, wherein the alarm adjustment algorithm includes:

the second heartbeat period of the application=((the first heartbeat period of the application+the preset trigger heartbeat period−1)/the preset trigger heartbeat period)*the preset trigger heartbeat period.

* * * * *